United States Patent
Girault

(10) Patent No.: US 7,330,549 B2
(45) Date of Patent: Feb. 12, 2008

(54) METHOD OF PRODUCING A CRYPTOGRAPHIC UNIT FOR AN ASYMMETRIC CRYPTOGRAPHY SYSTEM USING A DISCRETE LOGARITHM FUNCTION

(75) Inventor: Marc Girault, Caen (FR)

(73) Assignee: France Telecom, Paris (FR)

( * ) Notice: Subject to any disclaimer, the term of this patent is extended or adjusted under 35 U.S.C. 154(b) by 650 days.

(21) Appl. No.: 10/487,388

(22) PCT Filed: Aug. 16, 2002

(86) PCT No.: PCT/FR02/02896

§ 371 (c)(1),
(2), (4) Date: Feb. 20, 2004

(87) PCT Pub. No.: WO03/017569

PCT Pub. Date: Feb. 27, 2003

(65) Prior Publication Data

US 2005/0018841 A1    Jan. 27, 2005

(30) Foreign Application Priority Data

Aug. 20, 2001  (FR) ................................. 01 10938

(51) Int. Cl.
*H04L 9/00*    (2006.01)
*H04L 9/28*    (2006.01)
*H04L 9/30*    (2006.01)

(52) U.S. Cl. .......................................... 380/44; 380/30
(58) Field of Classification Search ................ 380/44
See application file for complete search history.

(56) References Cited

U.S. PATENT DOCUMENTS

| | | | | |
|---|---|---|---|---|
| 4,668,103 | A | * | 5/1987 | Wilson ........................ 380/30 |
| 5,297,206 | A | * | 3/1994 | Orton ......................... 380/30 |
| 5,966,445 | A | * | 10/1999 | Park et al. .................. 713/180 |

FOREIGN PATENT DOCUMENTS

EP    0 666 664 B1    8/1995

OTHER PUBLICATIONS

Rivest et al., "A Method for Obtaining Digital Signatures and Public-Key Cryptosystems," *Communications of the ACM*, 21(2), 120-126 (1978).
Schnorr C.P., "Efficient Identification and Signatures for Smart Cards," *Lecture Notes in Computer Science,*Springer Verlag, New York, NY, US, pp. 239-252 (1989).

* cited by examiner

*Primary Examiner*—Nasser Moazzami
*Assistant Examiner*—Oscar A Louie
(74) *Attorney, Agent, or Firm*—Drinker Biddle & Reath LLP

(57) ABSTRACT

The invention relates to a group of public-key cryptography schemas that use the discrete logarithm problem with the purpose of reducing the cost of developing, producing and maintaining a cryptographic unit. One of the entities (10) performs a calculation comprising at most a small number of additions, subtractions and multiplications of integers, said calculation being common to all of the schemas of the group. The aforementioned calculation is preferably the main calculation to be performed by the entity in question while most of the other calculations can be performed in advance. In particular, said calculation is of the y=ar+bs type, wherein r is a random number and s is a secret key that is specific to the entity (10). The calculation is common to a group of schemas for entity authentication, message authentication, digital signatures and key exchange.

11 Claims, 2 Drawing Sheets

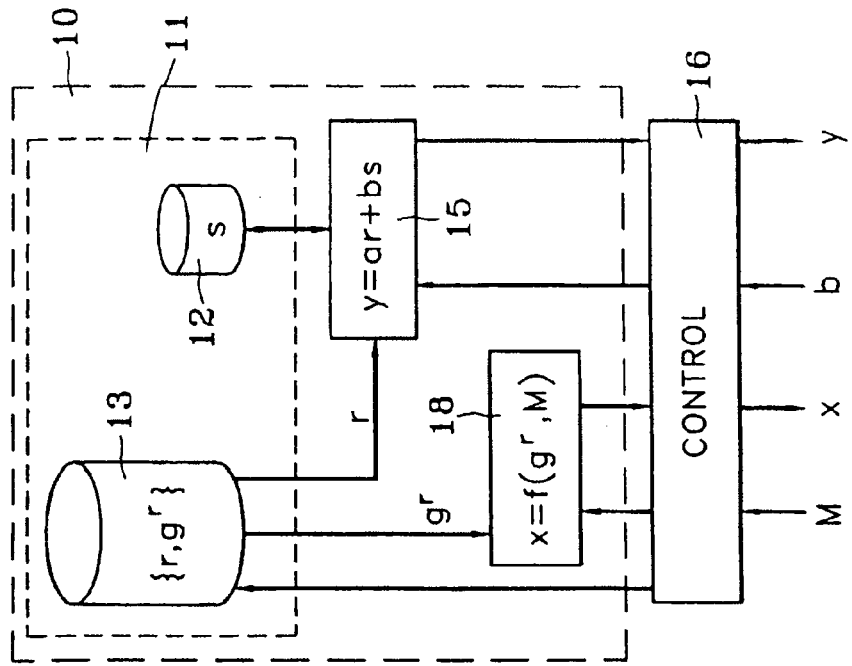
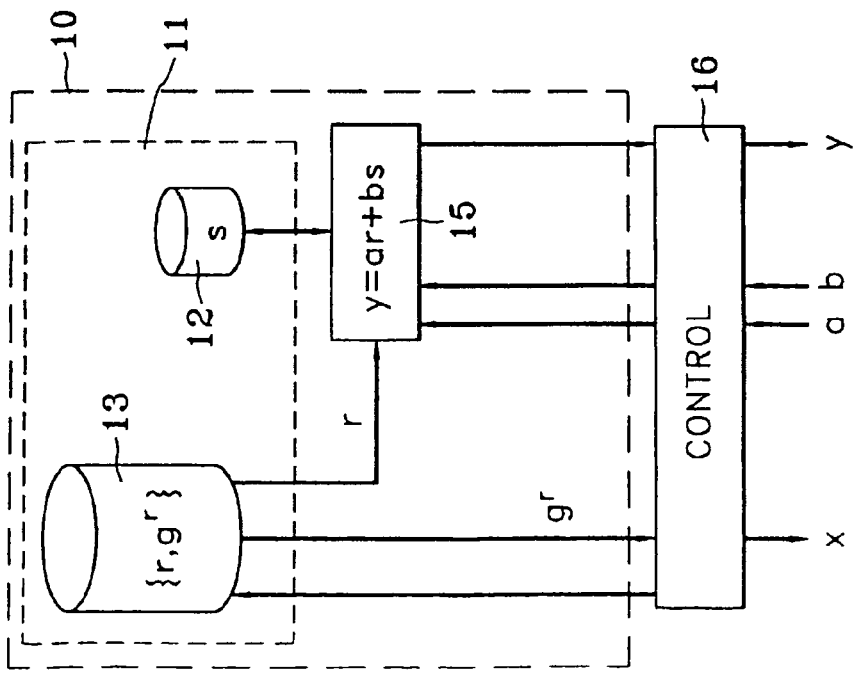

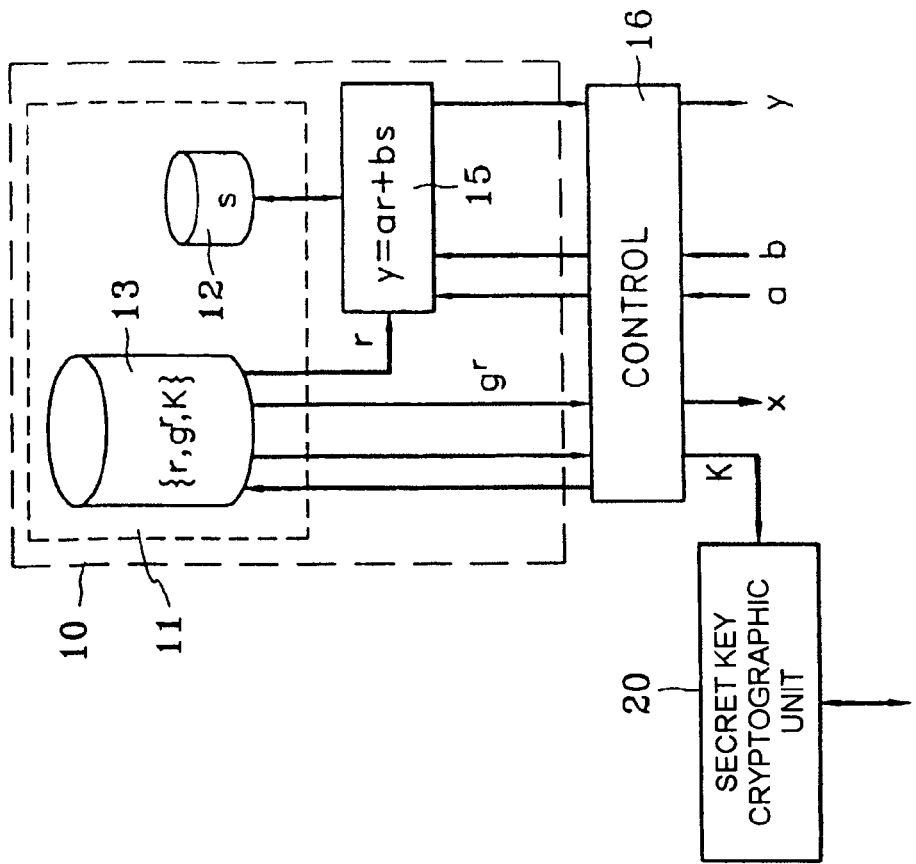
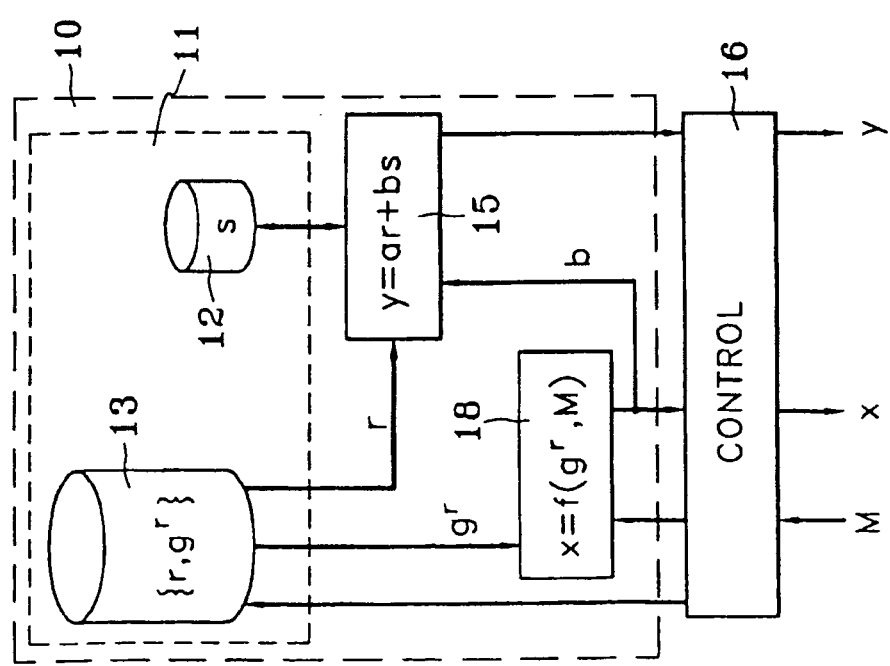

METHOD OF PRODUCING A CRYPTOGRAPHIC UNIT FOR AN ASYMMETRIC CRYPTOGRAPHY SYSTEM USING A DISCRETE LOGARITHM FUNCTION

BACKGROUND OF THE INVENTION

The present invention relates to the technical domain of cryptography, and more precisely of the so-called asymmetric or public key cryptography.

In this type of cryptography, each user holds a pair of keys, consisting of a secret key and of an associated public key, for a given use.

For example, if one is dealing with a key pair dedicated to confidentiality, then the public key is used to encrypt the data, while the secret key is used to decrypt them, i.e. to decipher these data. If one is dealing with a key pair dedicated to data authenticity, then the secret key is used to digitally sign the data, while the public key is used to verify the digital signature. Other uses (entity authentication, exchange of keys, etc.) are possible.

Public key cryptography is very useful insofar as, unlike secret key cryptography, it does not require the parties involved to share a secret in order to set up a secure communication. However, this advantage in terms of security is accompanied by a disadvantage in terms of performance, since the public key cryptography methods (also called "public key schemes") are, for equal resources, often a hundred or a thousand times slower than the so-called secret key cryptography methods (also called "secret key schemes"). As a result, to obtain reasonable calculation times, the cost of the circuits implementing these algorithms is often very high.

This is particularly true of the so-called RSA digital encryption and signature scheme (see R. L. Rivest, A. Shamir and L. M. Adleman, "A Method for Obtaining Digital Signatures and Public-Key Cryptosystems", Communications of the ACM, Vol. 21, No. 2, pp. 120-126, February 1978). This scheme relies on the difficulty of the problem of integer factorization: given a large integer (typically more than 1,000 bits in its representation in base 2) equal to the product of two or more prime factors of comparable sizes, no efficient procedure exists for retrieving these prime factors. The calculations performed in this scheme therefore relate to very large numbers. They cannot be performed in less than a second on a chip card unless the latter is fitted with a specialized cryptographic coprocessor, which considerably increases its cost. Moreover, since the efficiency of factorization procedures is growing fairly rapidly with time, key lengths often have to be revised upward, to the detriment of performance.

The question of reducing the cost of chips implementing public key schemes therefore arises.

There are principally two approaches for tackling this question. The first consists in specifying new cryptographic schemes, preferably (but not necessarily) based on problems other than factorization, which make it possible to significantly speed up the calculation times. This avenue is much explored, and has given rise to numerous results. However, in the great majority of cases, either the improvement compared with RSA is not significant enough to envisage the replacement thereof, or security has not been sufficiently well established.

The second approach consists in manufacturing chips in such quantity that their cost decreases in large proportion. This is what will perhaps happen with RSA if the international banking organizations confirm the choice of this scheme for future chip-based bank cards. However, the cost of an RSA chip is so high at the outset that it will always remain substantial, whatever the number of chips fabricated.

It will be noted that many public key cryptographic schemes have in common the use of operations on integers as basic operations, such as modular multiplications (ab (modulo n)), modular divisions (a/b (modulo n)), or modular exponentiations (ab (modulo n)), where a, b and n are integers. However, these operations are never exactly the same. Consequently, each time the cryptographic scheme is modified, it is necessary to change the program or the circuit of the security device which performs the cryptographic calculations.

An object of the present invention is to decrease the cost of public key cryptographic units by combining the two approaches above.

SUMMARY OF THE INVENTION

The invention thus proposes a method of producing a cryptographic unit associated with an integer secret key s in an asymmetric cryptography system, wherein the cryptographic unit is equipped with a component produced independently of the cryptography system and suitable for delivering an integer y through a combination between several integer operands including a random number r, the secret key s and at least one further operand (a, b). After having selected the cryptography system by associating with the secret key s a public key comprising a first element g of a set G provided with a multiplication operation, the cryptographic unit is equipped with a generator of cryptographic data suites each including a random number r submitted as operand to said component and a value x dependent on the element $g^r$ of the set G, and delivered by the unit in association with the integer y.

The component, which may consist of one or more circuit portions or of one or more software modules, applies a basic cryptographic item of very fast execution, which may advantageously be common to a high number of different cryptographic schemes: authentication, signature, key exchange schemes etc., using diverse mathematical objects (sets G and multiplication operations making it possible to define a variety of discrete logarithm functions).

The fact that this component is common to a high number of schemes allows better amortization of the industrial development and fabrication costs. Generic units (for example chip cards) fitted with the component can advantageously be produced in very large quantity, given that these units will be suitable for all the schemes of the relevant family and that they will usually enable to achieve the performance demanded by such or such application.

More particularly, the public key further comprises an element v of the set G such that the $v=g^s$ or $v=g^{-s}$. The method gives rise to cryptographic units able to apply a whole family of schemes based on the generalized discrete logarithm problem. This problem can be stated in its generality as follows: let G be a set provided with a multiplication operation (i.e. a function which, with two elements a and b, associates an element denoted "a.b", or simply "ab", called the product of a and b), g an element of G, u a (large) integer and w the element of G defined by $w=g^u$ (i.e. the product gg . . . g with u occurrences of g); then it is in practice impossible to retrieve u from g and w.

European patent No. 0 666 664 describes an exemplary electronic signature scheme of this type, where G is the set of integers at least equal to 0 and smaller than n, and the multiplication operation is the ordinary product of integers, modulo n.

With the method according to the invention, if it occurs, that for a given set G and a certain multiplication operation, discrete logarithm calculation algorithms that are much more efficient than those previously known are discovered, then it suffices to change the set in which the calculations are performed and/or the multiplication operation in order to retrieve the desired security level.

The discrete logarithm problem can a priori be stated in any set provided with an operation. However, in order for it to be possible to perform the calculation of an exponential in a short time and provide a result of small size, certain properties are required, such that at present the most appropriate sets are groups. Among other properties, a group always contains a neutral element, i.e. an element denoted $\epsilon$ (or simply 1) such that the products $\epsilon.a$ and $a.\epsilon$ are both equal to a, and are so for any element a. Moreover, every element a possesses in the group an inverse denoted $a^{-1}$, i.e. an element such that the products $a^{-1}.a$ and $a.a^{-1}$ are both equal to $\epsilon$. Typical examples of groups used in cryptography are rings or fields of integers and elliptic curves.

It is thus possible to define a cryptographic component which does not depend in any way on the relevant group or more generally on the set G under consideration. This implies firstly that this component does not act on elements of the set itself. This also implies that it does not depend on characteristics of the group nor on the element g under consideration, in particular on the order of g in G, i.e. the smallest nonzero integer q (if it exists) satisfying $g^q=\epsilon$.

In a preferred embodiment of the invention, the combination effected by the component consists only of a small number of additions, of subtractions and of multiplications between integers, none of which has any connection with the characteristics of G and of g. In particular, this combination can be of the form y=ar+bs, where a and b are two further integer operands. A further simplification consists in taking a=1 or b=1.

An advantage of this choice of such a component is its speed: if they are only few multiplications to be performed (one or two), the component will be high speed (a few milliseconds) and may be incorporated into any environment, in particular into a low-cost microprocessor card.

The generator of cryptographic data suites may be constructed by associating a random number generator with a module for calculating exponentials over the set G.

However, in the preferred embodiment of the method, the generator of cryptographic data suites comprises a programmable memory for receiving pairs {r, x} or {r, $g^r$} calculated in advance. In this way, the cryptographic unit can be produced in its entirety independently of the set G and of the multiplication operation that are adopted. It merely remains to write to the programmable memory the secret key s and a certain number of pairs {r, x} or {r, $g^r$} calculated in advance. In operation, the common component will carry out the sole calculation required at the level of the cryptographic unit.

The fact that the unit can thus be used autonomously makes it possible to further improve the amortization of the development and fabrication costs since the same circuit (rather than only the same part of the circuit) can be used in various target applications. Moreover, the fact that the component is very fast in execution makes it possible to install it in very low cost circuits, and hence, in autonomous mode, in very inexpensive units such as regular microprocessor cards, with or without contacts.

A further advantage of this autonomy is the possibility of being able to change the cryptographic scheme, for example because the latter has been broken (i.e. because attacks have been found that considerably reduced the level of security that it provided), without having to develop and fabricate another circuit, with the resulting productivity savings.

If, moreover, the unit uses a value x whose length is not intended to vary over time (for example because its calculation from $g^r$ involves a predefined hash function), then it is also possible, while retaining the same scheme, to change the lengths of the other keys used without having to develop and fabricate another circuit.

Furthermore, in the last two situations, not only is there no reason to develop and fabricate another circuit, but, if the latter is designed suitably, there is not even any reason to change the security devices (for example the chip cards) that contain them, even after these devices have been deployed. This advantage is very significant since the changing of the circuit or the program of a circuit in a security device already in circulation (or the security device itself) is always a very expensive operation.

The invention can advantageously be used by semiconductor manufacturers producing secure chips, industries fabricating security devices from these chips, such as chip embedders (chip cards with or without contacts), and the organizations (banks, telecommunications, truckers, etc.) deploying such devices, for which the replacement of the cryptographic units incurs a high development, fabrication, management or maintenance cost.

To summarize, the invention gives rise to a family of public key cryptography schemes using the discrete logarithm problem, in which one of the entities performs a calculation consisting at most of a small number of additions, subtractions and multiplications of integers, this calculation being common to all the schemes of the family. This calculation preferably represents most of the calculations to be performed by this entity, since the most of the other calculations may be performed in advance.

BRIEF DESCRIPTION OF THE DRAWINGS

FIGS. 1 to 4 are schematic diagrams of cryptographic units produced in accordance with the invention.

DESCRIPTION OF PREFERRED EMBODIMENTS

Considered below is a family of entity authentication protocols, with extensions to the authentication of messages and to the digital signature of messages, and of protocols for exchanging keys all implementing a common component. The authenticity of a public key of an entity A used by another entity B is assumed to have been verified previously by this entity B.

Let G be a set provided with a multiplication operation and g be an element of G. The secret key of the entity A is an integer s. It should be noted that the size of this integer s (number of bits of its base 2 decomposition) is independent of G and of g. The public key associated with s for the entity A is the pair {g, v}, where $v=g^s$.

In an exemplary embodiment of the invention, the authentication of entity A by entity B takes place as follows:

1. A randomly picks an integer r, calculates $x=g^r$ and sends x to B;
2. B randomly picks two integer operands a and b, and sends them to A;

3. A calculates y=ar+bs and sends y to B.

4. B verifies that $g^y = x^a v^b$.

Many variants of this basic protocol are possible, as is its adaptation to message authentication and to digital message signature:

- a or b can be fixed in advance at a non-zero value (for example a=1), in which case this operand need not be transmitted and the combination y=ar+bs now involves only one multiplication;
- y=ar+bs can be replaced by y=ar−bs and the verification equation by: $g^y v^b = x^a$;
- y=ar+bs can be replaced by y=bs−ar and the verification equation by: $g^y x^a = v^b$;
- y=ar+bs can be replaced by y=−ar−bs and the verification equation by: $g^y x^a v^b = 1$;
- if G is a group, the sign of the secret key s can be reversed, i.e. we can take $v = g^{-s} = (g^s)^{-1}$, in which case the verification equation becomes: $g^y v^b = x^a$; this choice can of course be combined with any one of the above variations;
- in each case where the verification equation is of the form $g^y v^b = x$, thus assuming a=1, $x = g^r$ can be replaced by $x = f(g^r)$, where f is a function, for example equal to (or including) a cryptographic hash function; the verification equation then becomes: $f(g^y v^b) = x$;
- again in each case where the verification equation is of the form $g^y v^b = x$, thus assuming a=1, if M is a message to be certified by A, $x = g^r$ can be replaced by $x = f(g^r, M)$, where f is a function, for example equal to (or including) a cryptographic hash function; the verification equation then becomes: $f(g^y v^b, M) = x$; the protocol obtained is a message authentication protocol;
- again in each case where the verification equation is of the form $g^y v^b = x$, thus assuming a=1, if M is a message to be certified by A, $x = g^r$ can be replaced by $x = f(g^r, M)$, where f is a function, for example equal to (or including) a cryptographic hash function, then we calculate b=h(x) where h is a function with no particular cryptographic properties, for example the identity; in this case step 2 no longer involves entity A; the verification equation becomes $f(g^y v^{h(x)}, M) = x$; the protocol obtained is a digital message signature protocol (in the particular case where G is the set of non-negative integers less than n and where the operation is multiplication modulo n, we recover obtain the electronic signature scheme described in European patent 0 666 664).

It is noted that in step 3, entity A has only one addition and one or two multiplications of integers to perform. It is also noted that this combination is independent of the selected set G. Finally, it is noted that the other calculation ($x = g^r$ or $f(g^r)$) that A has to perform may be done in advance. It is thus possible to calculate a certain number of values of $g^r$ (to which a function f is or is not applied) in advance, and then to store them in a programmable memory in association with the corresponding random numbers r.

With the same parameters, supplemented with a private key s' and an associated public key g', v' for entity B, obtained according to the same rules as for entity A with g'=g: $v' = g^{s'}$, a key exchange protocol can be defined as follows:

1. A randomly picks an integer r, calculates $x = g^r$ and sends x to B; A calculates the common key $K = v'^r (= g^{s'r})$;
2. B randomly picks two integer operands a and b and sends them to A;
3. A calculates y=ar+bs and sends y to B.
4. B verifies that $g^y = x^a v^b$. B calculates the common key: $K = x^{s'} (= g^{rs'})$ This protocol enables on the one hand a key to be exchanged according to the Diffie-Hellman scheme, and on the other hand the key exchange to be authenticated on either side. The common key K could also be calculated as a predetermined function of $v'^r$.

It is again noted that in step 3, entity A has only one addition and only one or two multiplications of integers to perform. It is also noted that this combination is independent of the set G chosen. Finally, it is noted that the other calculations that entity A has to perform may be done in advance. It is therefore possible to calculate a certain number of values of x and of K in advance, and then to store them in a programmable memory.

Thus, by developing a program or a circuit implementing the sole function y=ar+bs (or one of the alternatives mentioned above), a basic software or hardware brick is obtained that can be used in different cryptographic schemes, fulfilling different roles such as authentication, key exchange, etc. A scheme fulfilling a given role may even be modified during the lifetime of the security device including this program or this circuit. For example, it is possible to replace the authentication scheme by another one, or to keep the same one but modify the set or the group G in which the calculations are performed. Indeed, these modifications have an impact only on the values calculated in advance, but not on the component itself.

FIG. 1 diagrammatically shows an exemplary cryptographic unit A produced according to the invention. This unit consists of a chip having a region 10 to which access is protected by techniques well known to those skilled in the art.

The protected region 10 comprises the programmable memory 11 intended to receive on the one hand the secret key s of the unit A (area 12), and on the other hand pairs {r, $g^r$} determined independently of s once the set G and its multiplication operation have been defined (area 13). The protected region 10 furthermore comprises the component 15 serving to calculate the integer y=ar+bs as a function of a random integer r received from the memory area 13, of the secret key s received from the memory area 12 and of the two further operands a, b submitted by a control module 16.

Various ways of storing several pairs {r, $g^r$} in the area 13 are possible. Each value of r and each value of $g^r$ can for example be stored in extenso in a table with associative matching between the value of r and the value of $g^r$ of the same pair. Advantageously in microcircuits with limited memory size, a simple index is associated with each value of $g^r$ so as to save the memory space that would be required for storing several values of r, generally large. The various values of r are pre-calculated by means of a pseudo-random generator from a seed value $r_0$ and from the corresponding index so as to pre-calculate and store the value of $g^r$ for this index. The programmable memory 11 then comprises the pseudo-random generator and initially the seed value r0 so as to receive each value of r from the corresponding index by activating the pseudo-random generator without having to store in extenso each value of r so as to match it up with the value of $g^r$ by virtue of the index.

In response to an authentication request issued by a remote entity B, the control module 16 orders the memory area 13 to deliver an integer r addressed to the component 15 and also the associated element $g^r$ of the set G, which may constitute the value x transmitted to the entity B. The further operands a, b received from entity B are moreover presented to the component 15 by the control module 16, and then the integer y returned by the component is communicated to entity B by the control module 16. Entity B which knows the public key g, v, will then be able to authenticate A with the aid of the verification equation $g^y = x^a v^b$.

In the variant of FIG. 2, the unit A caters for the authentication of messages M. The protected region 10 and the control module 16 are essentially the same as in the example of FIG. 1, by fixing a=1. The protected zone 10 is supplemented with a hash module 18 which applies a predetermined cryptographic hash function f. The arguments of this function f are the element $g^r$ coming from the memory area 13 and the message to be certified M provided by the control module 16. The result x is addressed to the control module 16 which communicates it to entity B.

The hash module 18 could also be present in the embodiment according to FIG. 1, without the argument M (or with a default value of this argument), so as to produce a key value x having a size specified independently of the set G.

It is therefore seen that the same circuit is suitable for both applications.

The same holds for the unit according to FIG. 3, which caters for the signing of messages M, i.e. independently of the entities which may possibly examine this signature. If the result x delivered by the hash module 18 takes the form of an integer, it can be provided to the component 15 as operand b. It is also possible to apply a function h to it beforehand, as indicated previously.

In the embodiment according to FIG. 4, the memory area 13 further associates with each random number r a secret session key K determined as a function of the public key g, v' of entity B (which must therefore be known in advance): K=v'$^r$. This session key K is addressed to a secret key cryptography unit 20 operating in a conventional manner according to a symmetric cryptography algorithm, so as to be usable in a communication with the entity B. The latter makes sure of the integrity of the secret key K with the aid of the verification equation $g^y = x^a v^b$ or of one of its variants described previously.

The invention claimed is:

1. A method of producing a cryptographic unit associated with an integer secret key s in an asymmetric cryptography system, comprising the steps of:
   providing the cryptographic unit with a component produced independently of the cryptography system and suitable for delivering an integer y through a combination between several integer operands including a random number r, the secret key s and at least one further operand (a, b);
   selecting the cryptography system by associating with the secret key s a public key comprising a first element g of a set G provided with a multiplication operation; and
   providing the cryptographic unit with a generator of cryptographic data suites including a programmable memory receiving pairs {r, x} or {r, $g^r$} calculated in advance, said cryptographic data suites each including said random number r submitted as operand to said component and said value x dependent on the element $g^r$ of the set G, and delivered by the unit in association with the integer y.

2. The method as claimed in claim 1, wherein the public key comprises a second element v of the set G such that $v = g^s$ or $v = g^{-s}$.

3. The method as claimed in claim 1, wherein the combination performed by said component is of the form y=ar+bs, where a and b are two further operands.

4. The method as claimed in claim 1 for the production of a cryptographic unit implementing a key exchange protocol, wherein the cryptographic unit is equipped with means of communication with another cryptographic unit to which the value x and the integer y are sent, said other cryptographic unit being associated with another integer secret key s', and wherein the step of selecting the cryptography system comprises associating with the secret key s' a public key composed of the element g and of another element v' of the set G such that $v' = g^{s'}$, wherein each cryptographic data suite produced by said generator includes, in addition to the random number r and said value x, a common key K dependent on the element $v'^r$ of the set G, which is not transmitted to said other cryptographic unit.

5. The method as claimed in claim 3, wherein the further operands a and b are received from a verification unit to which the value x and the integer y are sent.

6. The method as claimed in claim 3, wherein one of the further operands is equal to 1.

7. The method as claimed in claim 6, wherein the set G provided with the multiplication operation possesses a group structure.

8. The method as claimed in claim 7, wherein said component is so arranged that the other further operand is received from a verification unit to which the value x and the integer y are sent, and wherein the obtaining of the value x as a function of the element $g^r$ comprises applying a hash function.

9. The method as claimed in claim 7 for the production of a cryptographic unit implementing a message authentication protocol, wherein said component is so arranged that the other further operand is received from a verification unit to which the value x and the integer y are sent, and wherein the value x is a function of the element $g^r$ and of the content of a message to be certified by a device incorporating the cryptographic unit.

10. The method as claimed in claim 7 for the production of a cryptographic unit implementing a digital message signature protocol, wherein the further operand b is calculated as a function of the value x, and wherein the value x is a function of the element $g^r$ and of the content of a message to be certified by a device incorporating the cryptographic unit.

11. The method as claimed in claim 4, wherein the generator of cryptographic data suites comprises a programmable memory for receiving triplets {r, x, K} or {r, $g^r$, $v'^r$} calculated in advance.

* * * * *